United States Patent
Liu et al.

(10) Patent No.: US 12,227,063 B2
(45) Date of Patent: Feb. 18, 2025

(54) VEHICLE SUNROOF COMPRISING ENERGIZED SUNROOF GLASS, AND VEHICLE

(71) Applicant: Webasto SE, Stockdorf (DE)

(72) Inventors: Xiong Liu, Shanghai (CN); Jerry Hu, Shanghai (CN); Daniel Schuller, Shanghai (CN); Zhu Sulzer, Shanghai (CN)

(73) Assignee: WEBASTO SE, Stockdorf (DE)

( * ) Notice: Subject to any disclaimer, the term of this patent is extended or adjusted under 35 U.S.C. 154(b) by 190 days.

(21) Appl. No.: 17/802,889

(22) PCT Filed: Feb. 25, 2021

(86) PCT No.: PCT/IB2021/000150
§ 371 (c)(1),
(2) Date: Aug. 26, 2022

(87) PCT Pub. No.: WO2021/171097
PCT Pub. Date: Sep. 2, 2021

(65) Prior Publication Data
US 2023/0136411 A1    May 4, 2023

(30) Foreign Application Priority Data
Feb. 28, 2020 (CN) .......................... 202010129805.1

(51) Int. Cl.
*B60J 7/043* (2006.01)
*B60R 16/02* (2006.01)
(Continued)

(52) U.S. Cl.
CPC ............. *B60J 7/043* (2013.01); *B60J 7/0435* (2013.01); *B60R 16/0207* (2013.01); *B60R 16/023* (2013.01); *B60R 16/03* (2013.01)

(58) Field of Classification Search
CPC ....... B60J 7/043; B60J 7/02; B60J 7/04; B60J 3/04; B60R 16/0207; B60R 16/03;
(Continued)

(56) References Cited

U.S. PATENT DOCUMENTS 5,261,722 A    11/1993   Staley et al.
8,348,336 B2 *  1/2013   De Bie ...................... B60J 7/05
                                                        296/213
(Continued)

FOREIGN PATENT DOCUMENTS

DE    3713854 A1    10/1987
DE    19937221 C1    9/2000
(Continued)

OTHER PUBLICATIONS

PCT International Search Report and Written Opinion, PCT/IB2021/000150, Jul. 6, 2021, 11 pages.
(Continued)

*Primary Examiner* — Dennis H Pedder
(74) *Attorney, Agent, or Firm* — Quarles & Brady LLP (57) ABSTRACT

The present disclosure relates to a vehicle sunroof comprising an energized sunroof glass and to a vehicle. The energized sunroof glass comprises a rear glass and a front glass being slidable relative to the rear glass, wherein one of the rear glass and the front glass is electrically connected to a main wire harness of the sunroof, and wherein the vehicle sunroof further comprises an intermediate electrical connection structure configured to electrically connect the front glass to the rear glass when the front glass slides relative to the rear glass to a predetermined position. The vehicle sunroof saves the number of wire harnesses, has a simple structure and high integration, and is easy to control.

8 Claims, 7 Drawing Sheets

(51) Int. Cl.
*B60R 16/023* (2006.01)
*B60R 16/03* (2006.01)

(58) Field of Classification Search
CPC ....... B60R 16/02; B60R 16/023; B60Q 3/208; B60Q 3/78
See application file for complete search history.

(56) References Cited

U.S. PATENT DOCUMENTS 9,517,721 B2 * 12/2016 Frey .................. B32B 7/12
9,641,124 B2 *  5/2017 Eo .................... H01L 31/02013

FOREIGN PATENT DOCUMENTS

| EP | 2628619 A2 | 8/2013 |
| KR | 1020160052167 A | 5/2016 |
| KR | 1020190021949 A | 3/2019 |

OTHER PUBLICATIONS

Korean Intellectual Property Office, Request for the Submission of an Opinion, Application No. 10-2022-7033696, Mar. 19, 2024, 11 pages.

* cited by examiner

VEHICLE SUNROOF COMPRISING ENERGIZED SUNROOF GLASS, AND VEHICLE

CROSS-REFERENCE TO RELATED APPLICATIONS

The present application is a national stage application filed under 35 U.S.C. § 371 of International Application No. PCT/IB2021/000150, filed Feb. 25, 2021, which claims priority to Chinese Patent Application No. 202010129805.1, filed Feb. 28, 2020. Each of the aforementioned Patent Applications is incorporated by reference in its entirety for all purposes.

RELATED FIELD

The present disclosure relates to the technical field of vehicle sunroofs. More specifically, the present disclosure relates to a vehicle sunroof comprising an energized sunroof glass. The present disclosure further relates to a vehicle comprising the vehicle sunroof.

BACKGROUND

Currently, an openable transparent sunroof is installed on a top cover of most domestic vehicles to play a role in ventilation, daylighting and heat dissipation. This openable transparent sunroof generally includes a sunroof frame, a front glass and a rear glass. The front glass is installed at the front of the sunroof frame and is able to slide backward. The rear glass may be fixedly installed at the rear of the sunroof frame, or configured to be able to be tilted by a predetermined angle relative to the vehicle body, that is, the rear glass is tiltable.

In some models, both the front glass and the rear glass are energized glasses, so that various auxiliary functions can be realized with the help of these sunroof glasses to meet customers' increasing demand for driving experience. For example, an ambience light may be installed on a sunroof glass to illuminate the sunroof glass, so that the transparent sunroof glass is attached with other colors, and the visual effect of the sunroof glass is improved. For another example, both the front glass and the rear glass are dimming glasses, and the material properties of these dimming glasses can be changed by applying a voltage, so as to realize a switch-over between a transparent effect and a light-shielding effect. For another example, both the front glass and the rear glass are solar glasses capable of providing electric energy to the vehicle through a solar cell module installed therein.

For an energized sunroof glass in the prior art, the front glass and the rear glass have independent electrical connection structures. The connection structure of control circuit of the energized front glass generally has two types: a movable wire harness connection structure and a fixed contact type electrical connection structure.

Figure 1:
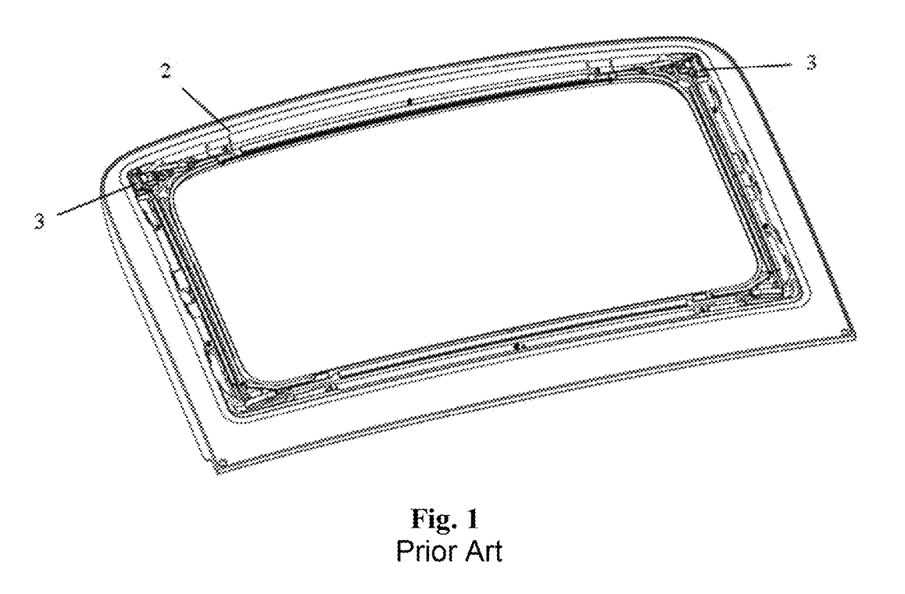
FIG. 1 is a schematic perspective view of an injection-molded encapsulation of a front glass of a vehicle sunroof comprising an energized sunroof glass in the prior art, wherein a fixed contact type electrical connection structure is used in the control circuit of the energized front glass of the vehicle sunroof.
Figure 2:
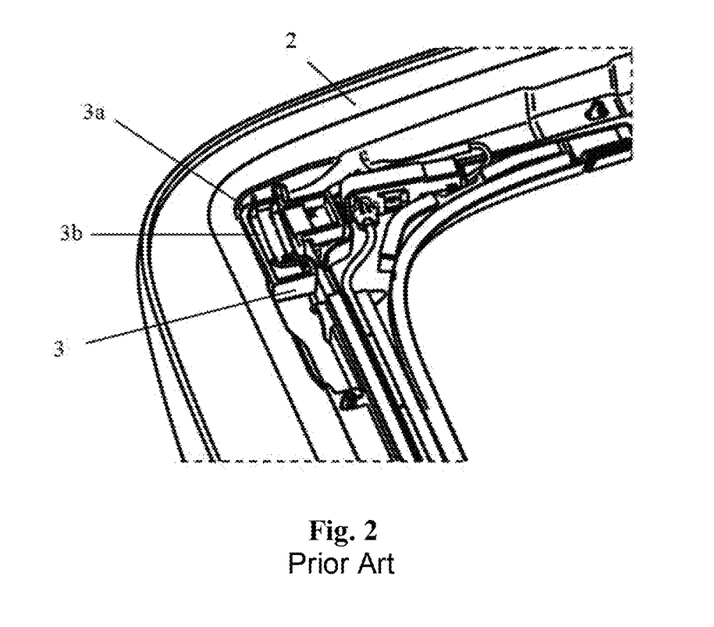
FIG. 2 is a schematic enlarged view of the injection-molded encapsulation of the front glass in FIG. 1 at the position of a glass pressing foot.
Figure 3:
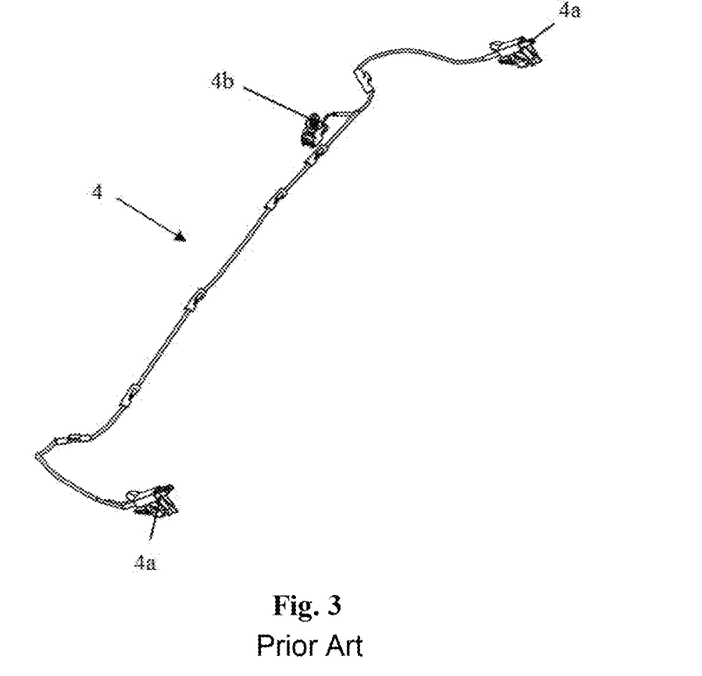
FIG. 3 is a schematic perspective view of a fixed wire harness configured to form electrical connection with the glass pressing foot of the injection-molded encapsulation of the front glass in FIG. 1.

FIG. 1 is a schematic perspective view of an injection-molded encapsulation 2 of a front glass of a vehicle sunroof including an energized sunroof glass in the prior art, wherein a fixed contact type electrical connection structure is used in the control circuit of the energized front glass (not shown) of the vehicle sunroof. FIG. 2 is a schematic enlarged view of the injection-molded encapsulation 2 of the front glass in FIG. 1 at the position of a glass pressing foot 3. FIG. 3 is a schematic perspective view of a fixed wire harness 4 configured to form electrical connection with the glass pressing foot 3 of the injection-molded encapsulation 2 of the front glass in FIG. 1.

As shown in FIGS. 1 and 2, the vehicle sunroof includes two glass pressing feet 3 fixed at front corners of the injection-molded encapsulation 2 of the front glass. When the sunroof needs to be closed, the front glass moves forward, and the glass pressing foot 3 presses against a windshield strip through sliding contact, so as to make a windshield curtain to be in a folded state. When the sunroof needs to be opened, the front glass moves backward, and the glass pressing foot 3 gradually separates from the windshield strip, so as to make the windshield curtain to be in an unfolded state.

The glass pressing foot 3 is provided with an electrical connector for electrically connecting the front glass to the fixed wire harness 4. More specifically, as shown in FIG. 2, the electrical connector includes a contact sheet 3a and an internal wire harness 3b electrically connected to the contact sheet 3a. The fixed wire harness 4 is fixedly installed at a front cross beam of a sunroof frame (not shown) of the vehicle sunroof, wherein two electrical contacts 4a of the fixed wire harness 4 are fixedly installed at two ends of the front cross beam, and an external plug 4b of the fixed wire harness 4 is configured to connect a main wire harness of the sunroof. While the sunroof is in the closed position, the two electrical contacts 4a contact the contact sheets 3a of the two glass pressing feet 3 (the portion of the contact sheet 3a that contacts the electrical contact 4a is located on the bottom surface of the glass pressing foot 3), so as to realize electrical conduction between the front glass end and the fixed wire harness 4.

However, the disadvantages of this kind of vehicle sunroof lie in that, the two electrical contacts 4a of the fixed wire harness 4 have a relatively large size, and are difficult to be arranged in a small space, and the electric control to the front glass end can only be realized when the sunroof is in the closed position.

SUMMARY

An object of the present disclosure is to overcome the above-mentioned disadvantages in the prior art, and to provide a new type of vehicle sunroof comprising an energized sunroof glass, and a vehicle comprising the vehicle sunroof. The vehicle sunroof saves the number of wire harnesses and has a simple structure and high integration, and is easy to control.

To this end, a first aspect of the present disclosure provides a vehicle sunroof comprising an energized sunroof glass comprising a rear glass and a front glass being slidable relative to the rear glass. One of the rear glass and the front glass is electrically connected to a main wire harness of the sunroof. The vehicle sunroof further comprises an intermediate electrical connection structure configured to electrically connect the front glass to the rear glass when the front glass slides relative to the rear glass to a predetermined position.

According to a preferred embodiment of the present disclosure, the intermediate electrical connection structure comprises a first electrical connection structure provided on the front glass and electrically connected to the front glass, and a second electrical connection structure provided on the rear glass and electrically connected to the rear glass. The first electrical connection structure and the second electrical connection structure are configured to contact each other when the front glass slides relative to the rear glass to the predetermined position, so as to electrically connect the front glass to the rear glass.

According to a preferred embodiment of the present disclosure, each of the first electrical connection structure and the second electrical connection structure comprises at least three electrical connectors, two of which are configured to realize power input, and at least one of which is configured to realize signal transmission.

According to a preferred embodiment of the present disclosure, the intermediate electrical connection structure comprises a signal label and a signal detector. One of the signal label and the signal detector is provided on the front glass, and the other is provided on the rear glass. The signal label and the signal detector are configured such that the signal detector detects the signal label when the front glass slides relative to the rear glass to the predetermined position, so as to electrically connect the front glass to the rear glass.

According to a preferred embodiment of the present disclosure, the predetermined position is a closed position of the sunroof.

According to a preferred embodiment of the present disclosure, the vehicle sunroof further comprises a front-end contact type electrical connection structure comprising: a glass pressing foot fixedly connected to the front glass and provided with a contact sheet, wherein the contact sheet is electrically connected to the front glass and is at least partially provided on a bottom surface of the glass pressing foot; and a windshield strip provided with an electrical connection strip extending along the longitudinal direction of the vehicle, wherein the electrical connection strip is electrically connected to the main wire harness of the sunroof, and is electrically connected to the contact sheet when the glass pressing foot and the windshield strip contact each other.

According to a preferred embodiment of the present disclosure, at least three contact sheets and at least three electrical connection strips are provided. Two of the at least three contact sheets or electrical connection strips are configured to realize power input, and at least one of the at least three contact sheets or electrical connection strips is configured to realize signal transmission.

According to a preferred embodiment of the present disclosure, the energized sunroof glass is a sunroof glass with an ambience light system. The ambience light system comprises an LED light strip installed along an edge of the front glass and of the rear glass, and an ambience light cover configured to cover the LED light strip. The LED light strip of the front glass is electrically connected to the LED light strip of the rear glass at the predetermined position by means of the intermediate electrical connection structure.

According to a preferred embodiment of the present disclosure, the energized sunroof glass is a dimming glass or a solar glass.

A second aspect of the present disclosure provides a vehicle comprising the vehicle sunroof comprising the energized sunroof glass according to the first aspect of the present disclosure.

Compared with the prior art, the vehicle sunroof comprising the energized sunroof glass according to the present disclosure has various advantages, in particular:

1) The intermediate electrical connection structure provided between the front glass and the rear glass is configured to directly electrically connect the front glass to the rear glass when the sunroof is, for example, in the closed position, so that only one of the front glass and the rear glass needs to be connected to the main wire harness of the sunroof, which effectively saves the number of wire harnesses;

2) In case that the main wire harness of the sunroof is provided at the front of the sunroof, the electrical connection strip capable of forming electrical contact with the contact sheet on the glass pressing foot is integrally provided on the windshield strip, and a static power supply harness is connected to the windshield strip to form electrical connection with the electrical connection strip, so that this contact type electrical connection structure is not complicated and is small in size, has high integration, and saves the length of the wire harness; moreover, due to the strip shape of the electrical connection strip, the electric control to the front glass can be realized when the sunroof is in the closed position, the tilted position, or even the comfortable position where the sunroof is slightly opened; and 3) The intermediate electrical connection structure between the front glass and the rear glass, and the front-end contact type electrical connection structure between the front glass and the windshield strip are cost-saving and are convenient to manufacture, so that this vehicle sunroof can be widely used in various vehicle models.

BRIEF DESCRIPTION OF THE DRAWINGS

Other features and advantages of the present disclosure will be better understood through the following preferred embodiments described in detail with reference to the accompanying drawings, in which the same reference numerals indicate the same or similar components.

DETAILED DESCRIPTION

The implementation and usage of the embodiments are discussed in detail below. However, it is conceivable that the specific embodiments discussed are merely intended to illustrate specific ways of implementing and using the present disclosure, and are not intended to limit the scope of the present disclosure.

Figure 4:
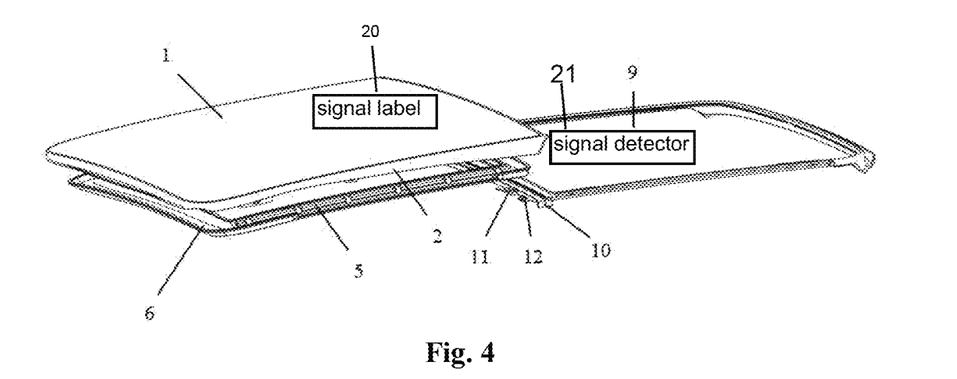
FIG. 4 is a schematic partially-exploded view of an embodiment of a vehicle sunroof comprising an energized sunroof glass according to the present disclosure.
Figure 5:
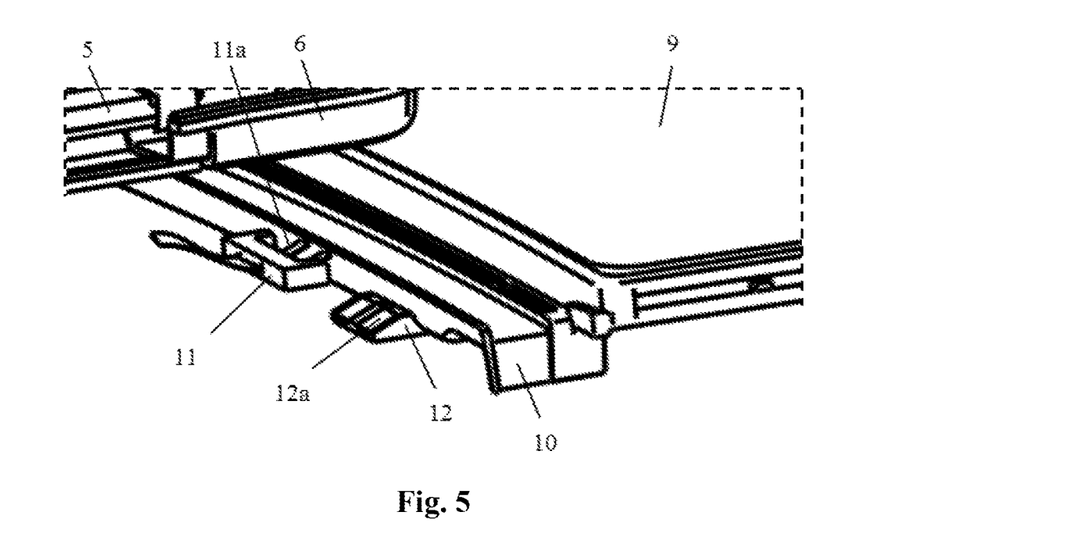
FIG. 5 is a schematic enlarged view of the vehicle sunroof in FIG. 4 at the position of an electrical connection structure between a front glass and a rear glass.

FIG. 4 is a schematic partially-exploded view of an embodiment of a vehicle sunroof including an energized sunroof glass according to the present disclosure, and FIG. 5 is a schematic enlarged view of the vehicle sunroof in FIG. 4 at the position of an electrical connection structure between a front glass 1 and a rear glass 9.

In the vehicle sunroof shown in FIGS. 4 and 5, the energized sunroof glass is a sunroof glass with an ambience light system, that is, the front glass 1 and the rear glass 9 of the vehicle sunroof are both installed with an ambience light system. For example, as shown in FIGS. 4 and 5, the ambience light system installed on the front glass 1 includes an LED light strip 5 installed along the left and right side edges of the front glass 1 and an annular ambience light cover 6 covering the LED light strip 5, and the ambience light system installed on the rear glass 9 generally has a similar structure and is thereby not shown in the figure.

In a vehicle sunroof in the prior art, the front glass and the rear glass have independent power supply structures. That is to say, a front-glass power-supply wire harness and a rear-glass power-supply wire harness are led out from a main wire harness of the sunroof. The front-glass power-supply wire harness is a movable wire harness or a fixed wire harness, so as to supply power to the front glass by means of a movable wire harness connection structure or a fixed contact type electrical connection structure. The rear-glass power-supply wire harness is a fixed wire harness, so as to supply power to the rear glass by the electrical connection between the fixed wire harness and the rear glass at a fixed position.

In the vehicle sunroof according to the present disclosure, in order to optimize the structure and save the number of wire harnesses, only one of the front glass 1 and the rear glass 9 is electrically connected to the main wire harness of the sunroof, and the vehicle sunroof further includes an intermediate electrical connection structure configured to electrically connect the front glass 1 to the rear glass 9 when the front glass 1 slides relative to the rear glass 9 to a predetermined position. More specifically, if the main wire harness of the sunroof is provided at the front of the sunroof assembly, the front glass 1 is electrically connected to the main wire harness of the sunroof so as to directly supply power to the LED light strip 5 of the front glass 1 through the main wire harness of the sunroof, and the front glass 1 is electrically connected to the rear glass 9 by means of the intermediate electrical connection structure when the front glass 1 slides relative to the rear glass 9 to the predetermined position, so as to supply power to the LED light strip of the rear glass 9. If the main wire harness of the sunroof is provided at the rear of the sunroof assembly, the rear glass 9 is electrically connected to the main wire harness of the sunroof so as to directly supply power to the LED light strip of the rear glass 9 through the main wire harness of the sunroof, and the front glass 1 is electrically connected to the rear glass 9 by means of the intermediate electrical connection structure when the front glass 1 slides relative to the rear glass 9 to the predetermined position, so as to supply power to the LED light strip 5 of the front glass 1. The predetermined position is generally the closed position of the sunroof, that is, when the front glass 1 slides to the foremost end relative to the rear glass 9, the LED light strip 5 of the front glass 1 is electrically connected to the LED light strip of the rear glass 9 by means of the intermediate electrical connection structure.

Figure 6:
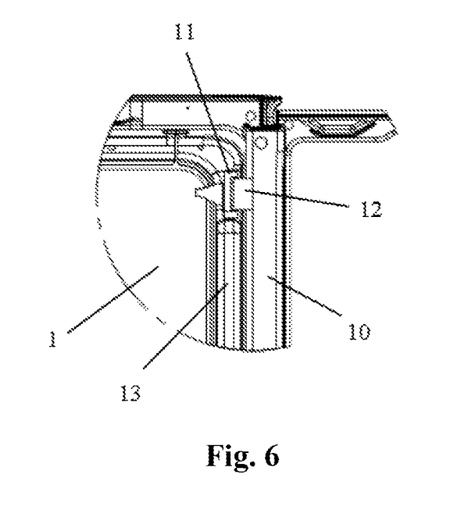
FIG. 6 is a schematic view of installation of an intermediate electrical connection structure of the vehicle sunroof in FIG. 4.
Figure 7:
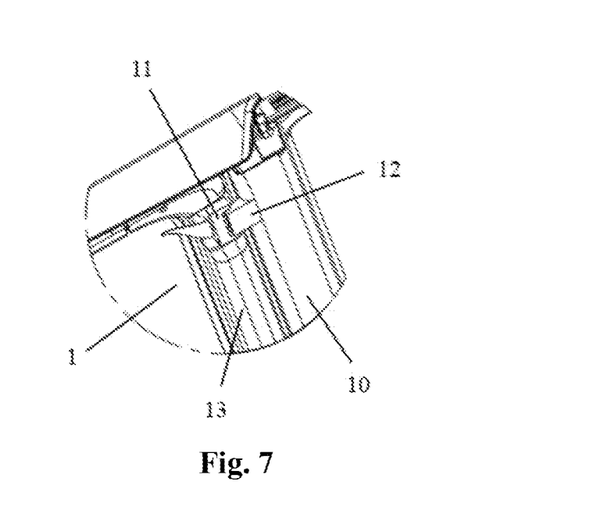
FIG. 7 is a schematic view of installation of the intermediate electrical connection structure of the vehicle sunroof in FIG. 4 from another perspective.
Figure 8:
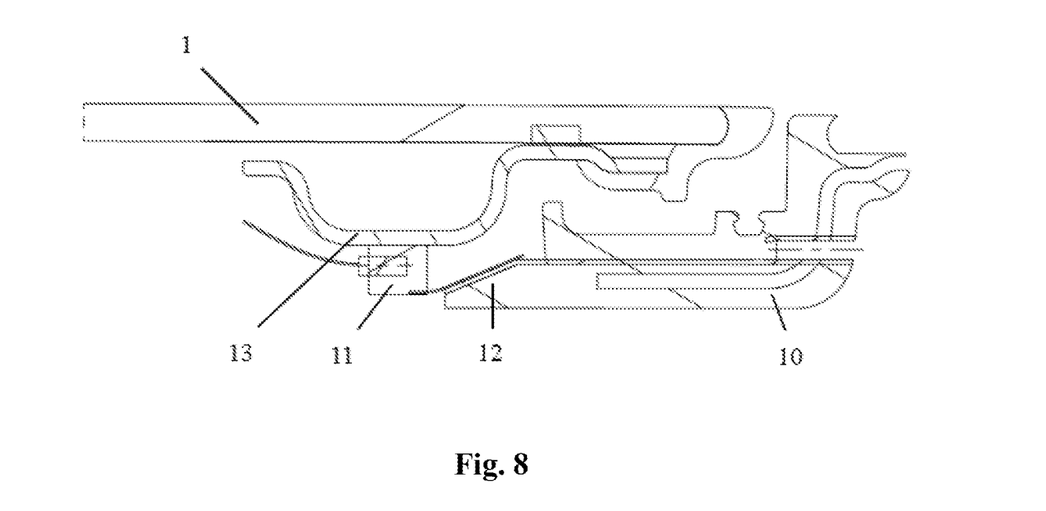
FIG. 8 is a schematic side-sectional view of installation of the intermediate electrical connection structure of the vehicle sunroof in FIG. 4.

FIG. 6 is a schematic view of installation of the intermediate electrical connection structure of the vehicle sunroof in FIG. 4. FIG. 7 is a schematic view of installation of the intermediate electrical connection structure of the vehicle sunroof in FIG. 4 from another perspective. FIG. 8 is a schematic side-sectional view of installation of the intermediate electrical connection structure of the vehicle sunroof in FIG. 4.

In the embodiment shown in FIGS. 4 to 8, the intermediate electrical connection structure includes a first electrical connection structure provided at a lateral rear end of the front glass 1 and a second electrical connection structure provided at a lateral front end of the rear glass 9. More specifically, the first electrical connection structure is a connecting member 11 that is electrically connected to the LED light strip 5 of the front glass 1. The connecting member 11 may be fixed by bonding, clamping or the like to a lateral rear end of a glass frame 13 provided along the edge of the front glass 1 as shown in FIGS. 6 to 8, or be fixed to a lateral rear end of the ambience light cover 6. The connecting member 11 is provided with a plurality of first electrical connectors (first electrical connection sheets 11a in this embodiment). The second electrical connection structure is a contact block 12 that is electrically connected to the LED light strip of the rear glass 9 and extends forward from a lateral front end of an injection-molded encapsulation 10 of the rear glass 9. The contact block 12 is provided with a plurality of second electrical connectors (second electrical connection sheets 12a in this embodiment). The first electrical connection sheet 11a and the second electrical connection sheet 12a are configured to contact each other when the front glass 1 slides relative to the rear glass 9 to the closed position of the sunroof, so as to electrically connect the LED light strip 5 of the front glass 1 to the LED light strip of the rear glass 9.

In fact, the first electrical connection structure and the second electrical connection structure are generally symmetrical structures with respect to the longitudinal central axis of the vehicle. That is to say, the first electrical connection structure includes two connecting members 11 that are respectively electrically connected to the two, left and right, LED light strips 5 of the front glass 1 and fixed to the two lateral rear ends of the glass frame 13 or the ambience light cover 6. The second electrical connection structure includes two contact blocks 12 that are respectively electrically connected to the two, left and right, LED light strips of the rear glass 9 and extend forward from the two lateral front ends of the injection-molded encapsulation 10 of the rear glass 9 to form electrical contact with the corresponding connecting members 11. Compared with the prior art, this symmetrical structure can dispense with a wire harness configured to connect the two LED light strips 5 of the front glass 1 or the two LED light strips of the rear glass 9, so that the layout of the power supply structure of the vehicle sunroof is simplified.

The connecting member 11 of the first electrical connection structure includes at least two first electrical connection sheets 11a, preferably, at least three first electrical connection sheets 11a, which at least include two first electrical connection sheets 11a for realizing power input, and may further include at least one first electrical connection sheet 11a for realizing signal transmission. Correspondingly, the contact block 12 of the second electrical connection structure includes at least two second electrical connection sheets 12a, preferably, at least three second electrical connection sheets 12a, which at least include two second electrical connection sheets 12a for realizing power input, and may further include at least one second electrical connection sheet 12a for realizing signal transmission.

Figure 9:
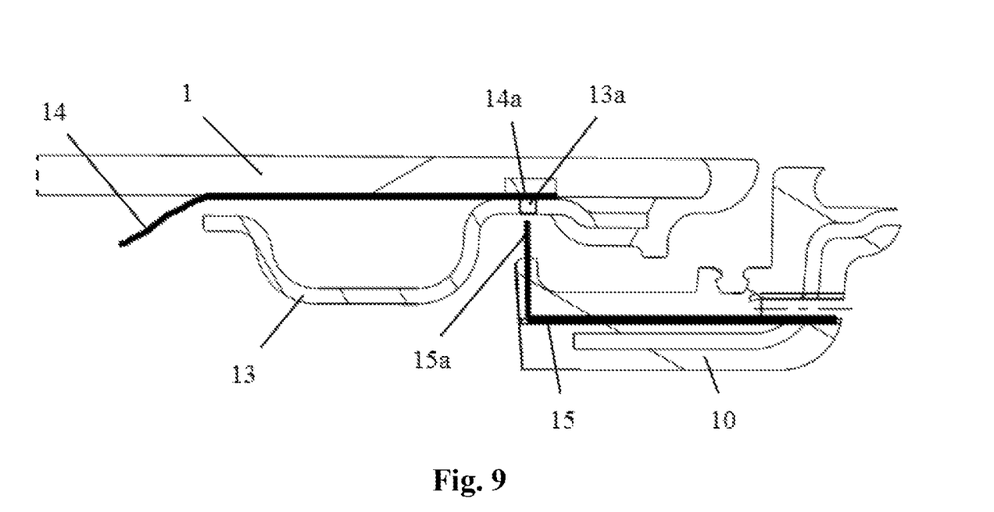
FIG. 9 is a schematic side-sectional view of installation of another intermediate electrical connection structure for the vehicle sunroof in FIG. 4.

FIG. 9 is a schematic side-sectional view of installation of another intermediate electrical connection structure for the vehicle sunroof in FIG. 4. In the embodiment shown in FIG. 9, the wire harness 14 of the LED light strip 5 of the front glass 1 is partially integrated in the glass frame 13, and is provided with a plurality of first electrical connectors (electrical contact points 14a in this embodiment) to form the first electrical connection structure, and holes 13a are provided on the glass frame 13 at the positions corresponding to the electrical contact points 14a. The wire harness 15 of the LED light strip of the rear glass 9 is partially integrated in the injection-molded encapsulation 10, and is provided with a plurality of second electrical connectors (flexible pins 15a in this embodiment) protruding from the injection-molded encapsulation 10 to form the second electrical connection structure. When the front glass 1 slides relative to the rear glass 9 to the closed position of the sunroof, the flexible pins 15a pass through the holes 13a to contact the electrical contact points 14a, so that the LED light strip 5 of the front glass 1 is electrically connected to the LED light strip of the rear glass 9. The intermediate electrical connection structure formed by the electrical contact points 14a and the flexible pins 15a is simple and has high integration. Since the flexible pins 15a are bendable and elastic (similar to a spring), the existence of the flexible pins 15a does not affect the sliding of the front glass 1, and can ensure the stability of the electrical connection under circumstances such as vehicle vibration.

Similar to the previous embodiment, due to the left-right symmetry of the LED light strips, the intermediate electrical connection structure formed by the electrical contact pins 14a and the flexible pins 15a is generally a symmetrical structure with respect to the longitudinal central axis of the vehicle, that is, the intermediate electrical connection structure includes two first electrical connection structures and two second electrical connection structures that are symmetrical. Each of the first electrical connection structures includes at least two electrical contact pins 14a, preferably, at least three electrical contact pins 14a, which at least include two electrical contact pins 14a for realizing power input, and may further include at least one electrical contact pin 14a for realizing signal transmission. Correspondingly, each of the second electrical connection structures includes at least two flexible pins 15a, preferably, at least three flexible pins 15a, which at least include two flexible pins 15a for realizing power input, and may further include at least one flexible pin 15a for realizing signal transmission.

According to another embodiment, the intermediate electrical connection structure includes a signal label and a signal detector. One of the signal label 20 and the signal detector 21 is provided on the front glass 1, and the other is provided on the rear glass 9. For example, the signal label 20 may be provided at the rear end of the injection-molded encapsulation 2 of the front glass 1, and the signal detector 21 may be provided at the front end of the injection-molded encapsulation 10 of the rear glass 9. The signal label 20 and the signal detector 21 are configured such that the signal detector 21 detects the signal label 20 when the front glass 1 slides relative to the rear glass 9 to the closed position of the sunroof, so as to automatically electrically connect the LED light strip 5 of the front glass 1 to the LED light strip of the rear glass 9.

Figure 10:
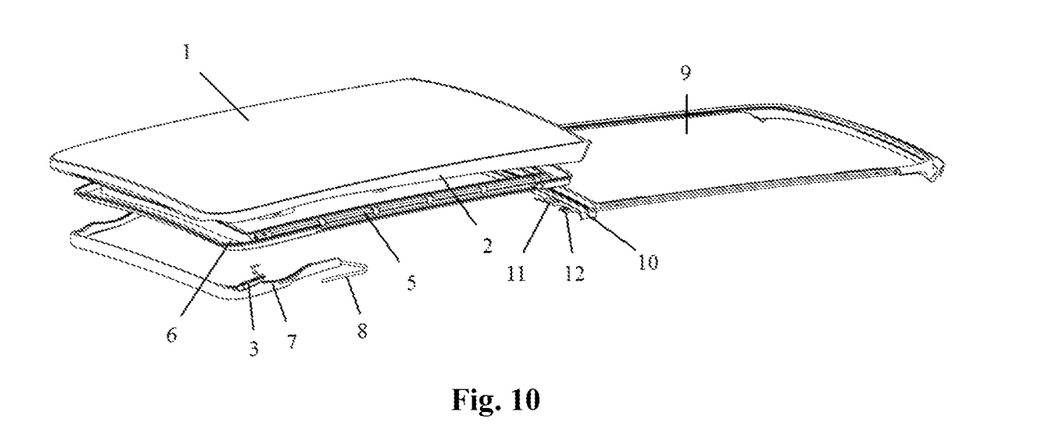
FIG. 10 is another schematic partially-exploded view of the vehicle sunroof in FIG. 4, wherein a front-end contact type electrical connection structure is used in the vehicle sunroof.
Figure 11:
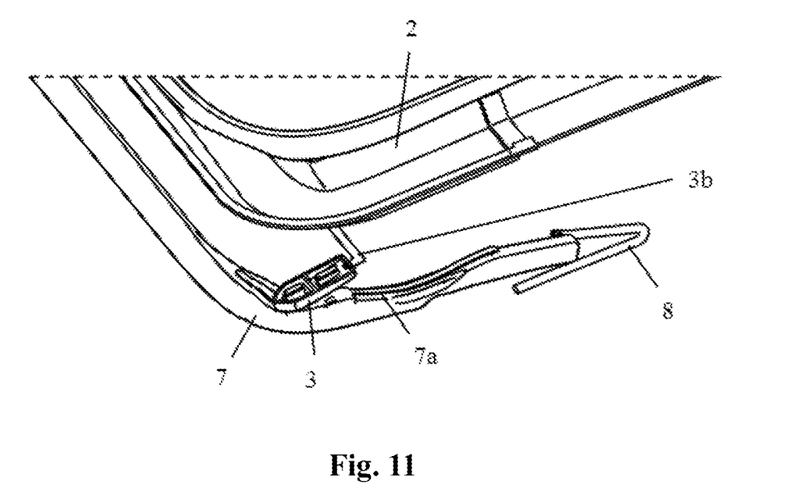
FIG. 11 is a schematic enlarged view of the vehicle sunroof in FIG. 10 at the position of the front-end contact type electrical connection structure.
Figure 12:
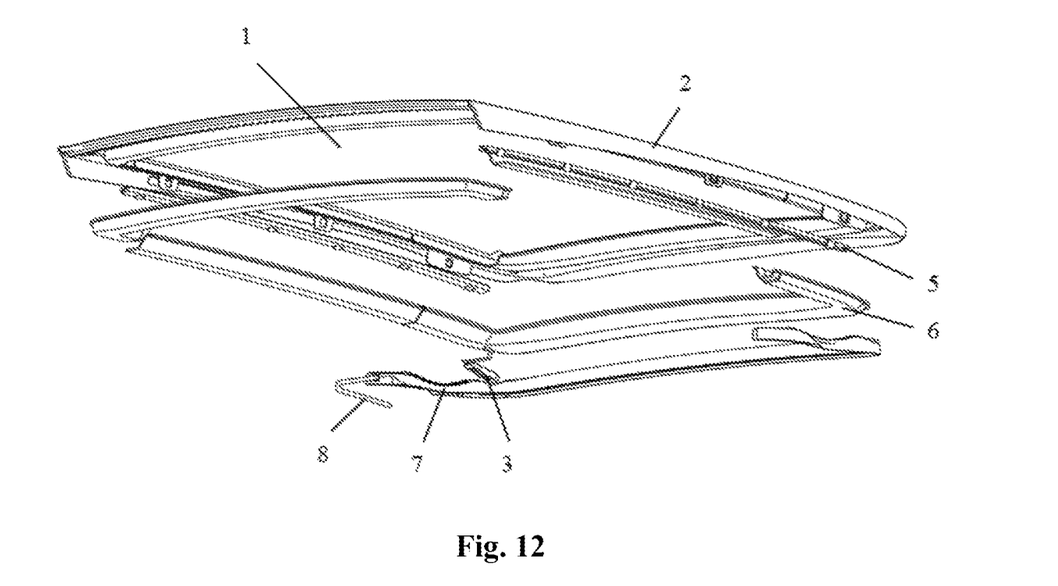
FIG. 12 is a schematic partially-exploded view of the vehicle sunroof in FIG. 10 from another perspective.
Figure 13:
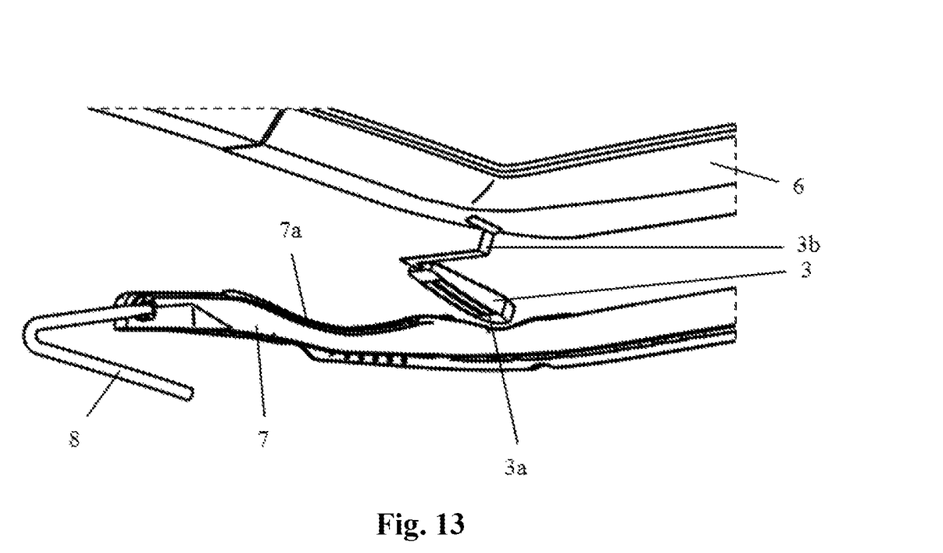
FIG. 13 is a schematic enlarged view of the vehicle sunroof in FIG. 12 at the position of the front-end contact type electrical connection structure.

FIG. 10 is another schematic partially-exploded view of the vehicle sunroof in FIG. 4, wherein a front-end contact type electrical connection structure is used in the vehicle sunroof. FIG. 11 is a schematic enlarged view of the vehicle sunroof in FIG. 10 at the position of the front-end contact type electrical connection structure. FIG. 12 is a schematic partially-exploded view of the vehicle sunroof in FIG. 10 from another perspective. FIG. 13 is a schematic enlarged view of the vehicle sunroof in FIG. 12 at the position of the front-end contact type electrical connection structure.

As shown in FIGS. 10 to 13, in case that the main wire harness of the sunroof is provided in the front of the sunroof assembly, the LED light strip 5 of the front glass 1 can be directly powered by the main wire harness of the sunroof by means of the front-end contact type electrical connection structure, while the rear glass 9 can be electrically connected to the front glass 1 when the front glass 1 slides to the closed position of the sunroof by means of the above-mentioned intermediate electrical connection structure, so that the LED light strip of the rear glass 9 can be powered.

Different from the prior art shown in FIGS. 1 to 3, the front-end contact type electrical connection structure is mainly composed of a glass pressing foot 3 and a windshield strip 7. More specifically, the glass pressing foot 3 is fixedly connected to a front corner of the injection-molded encapsulation 2 of the front glass 1 and is provided with a plurality of contact sheets 3a. These contact sheets 3a are electrically connected to the LED light strip 5 of the front glass 1 through the internal wire harness 3b, and each of the contact sheets 3a is at least partially provided on the bottom surface of the glass pressing foot 3 facing toward the windshield strip 7. A plurality of electrical connection strips 7a extending along the longitudinal direction of the vehicle are provided on the top surface of the windshield strip 7 facing toward the glass pressing foot 3. These electrical connection strips 7a are electrically connected to the main wire harness of the sunroof, and form electrical connection with these contact sheets 3a when the glass pressing foot 3 contacts the windshield strip 7, so that the LED light strip 5 of the front glass 1 is powered.

For example, the electrical connection strips 7a extend from the front corner of the windshield strip 7 to the rear end in the longitudinal direction of the vehicle, and the static power supply wire harness connected to the main wire harness of the sunroof is electrically connected to the electrical connection strips 7a at the rear end of the windshield strip 7. This arrangement minimizes the length of the static power supply wire harness, optimizes the integration of the front-end contact type electrical connection structure, and can realize the electrical control to the front glass 1 in any case where the glass pressing foot 3 contacts the windshield strip 7 (for example, when the sunroof is in the closed position, the tilted position, or even the comfortable position where the sunroof is slightly opened).

The glass pressing foot 3 is provided with at least two contact sheets 3*a*, preferably, at least three contact sheets 3*a*, which at least include two contact sheets 3*a* for realizing power input, and may further include at least one contact sheet 3*a* for realizing signal transmission. Correspondingly, the windshield strip 7 is provided with at least two electrical connection strips 7*a*, preferably, at least three electrical connection strips 7*a*, which at least include two electrical connection strips 7*a* for realizing power input, and may further include at least one electrical connection strip 7*a* for realizing signal transmission.

Apparently, the type of the energized sunroof glass of the vehicle sunroof according to the present disclosure is not limited to the sunroof glass with the ambience light system described above, and the energized sunroof glass may especially be a dimming glass or a solar glass.

The technical content and technical features of the present disclosure have been disclosed above. However, it is conceivable that, under the creative ideas of the present disclosure, those skilled in the art can make various changes and improvements to the concepts disclosed above, but these changes and improvements all belong to the protection scope of the present disclosure.

The description of the above embodiments is exemplary rather than limitative, and the protection scope of the present disclosure is defined by the appended claims.

The invention claimed is:

1. A vehicle sunroof comprising an energized sunroof glass comprising a rear glass and a front glass being slidable relative to the rear glass, wherein, in a first position, one of the rear glass and the front glass is electrically connected to a main wire harness of the sunroof and the other of the rear glass and the front glass is not electrically connected to the main wire harness, and wherein the vehicle sunroof further comprises an intermediate electrical connection structure configured to electrically connect the front glass to the rear glass when the front glass slides relative to the rear glass to a predetermined second position, wherein the intermediate electrical connection structure comprises a first electrical connection structure provided on the front glass and a second electrical connection structure provided on the rear glass, and wherein the first electrical connection structure and the second electrical connection structure are configured to contact each other when the front glass slides to the predetermined second position relative to the rear glass, so as to electrically connect the main wire harness to the second electrical connection structure on the rear glass, wherein each of the first electrical connection structure and the second electrical connection structure comprises at least three electrical connectors, two of which are configured to realize power input, and at least one of which is configured to realize signal transmission.

2. The vehicle sunroof comprising the energized sunroof glass according to claim 1, wherein the intermediate electrical connection structure comprises a signal label and a signal detector, one of the signal label and the signal detector being provided on the front glass, and the other of the signal label and the signal detector being provided on the rear glass, and wherein the signal label and the signal detector are configured such that the signal detector detects the signal label when the front glass slides relative to the rear glass to the predetermined position, so as to electrically connect the front glass to the rear glass.

3. The vehicle sunroof comprising the energized sunroof glass according to claim 1, wherein the predetermined position is a closed position of the sunroof.

4. The vehicle sunroof comprising the energized sunroof glass according to claim 1, wherein the vehicle sunroof further comprises a front-end contact type electrical connection structure comprising:
a glass pressing foot fixedly connected to the front glass and provided with a contact sheet, the contact sheet being electrically connected to the front glass and at least partially provided on a bottom surface of the glass pressing foot; and
a windshield strip with an electrical connection strip extending along the longitudinal direction of the vehicle, the electrical connection strip being electrically connected to the main wire harness of the sunroof, and being electrically connected to the contact sheet when the glass pressing foot and the windshield strip contact each other.

5. The vehicle sunroof comprising the energized sunroof glass according to claim 4, wherein at least three contact sheets and at least three electrical connection strips are provided, two of the at least three contact sheets or electrical connection strips being configured to realize power input, and at least one of the at least three contact sheets or electrical connection strips being configured to realize signal transmission.

6. The vehicle sunroof comprising the energized sunroof glass according to claim 1, wherein the energized sunroof glass is a sunroof glass with an ambience light system, and wherein the ambience light system comprises an LED light strip installed along an edge of the front glass and of the rear glass, and an ambience light cover configured to cover the LED light strip, and wherein the LED light strip of the front glass is electrically connected to the LED light strip of the rear glass at the predetermined position by means of the intermediate electrical connection structure.

7. The vehicle sunroof comprising the energized sunroof glass according to claim 1, wherein the energized sunroof glass is a dimming glass or a solar glass.

8. A vehicle comprising the vehicle sunroof comprising the energized sunroof glass according to claim 1.

* * * * *